(12) United States Patent
Ah

(10) Patent No.: US 9,518,714 B2
(45) Date of Patent: Dec. 13, 2016

(54) MOISTURE REMOVING DEVICE OF LAMP FOR VEHICLE

(71) Applicant: Hyundai Mobis Co., Ltd., Seoul (KR)

(72) Inventor: Sang Min Ah, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 111 days.

(21) Appl. No.: 14/680,680

(22) Filed: Apr. 7, 2015

(65) Prior Publication Data
US 2015/0330594 A1    Nov. 19, 2015

(30) Foreign Application Priority Data

May 15, 2014  (KR) .................. 10-2014-0058261

(51) Int. Cl.
*F21S 8/10*       (2006.01)
*H02K 35/02*    (2006.01)
*F03G 7/08*      (2006.01)
*B60Q 1/00*     (2006.01)

(52) U.S. Cl.
CPC ............ *F21S 48/31* (2013.01); *B60Q 1/0017* (2013.01); *F03G 7/08* (2013.01); *F21S 48/34* (2013.01); *H02K 35/02* (2013.01); *F21S 48/332* (2013.01)

(58) Field of Classification Search
CPC .......... F21S 48/31; F21S 48/34; F21S 48/332; B60Q 1/0017; H02K 35/02; F03G 7/08
See application file for complete search history.

(56) References Cited

U.S. PATENT DOCUMENTS

| 3,855,844 A * | 12/1974 | Craig ................. G01M 3/202 73/40.7 |
| 2011/0255293 A1* | 10/2011 | Lipscomb ............ F21V 31/03 362/362 |

FOREIGN PATENT DOCUMENTS

| KR | 10-2008-0003991 | 1/2008 |
| KR | 10-2009-0051616 | 5/2009 |
| KR | 10-2011-0037032 | 4/2011 |
| KR | 10-2012-0124873 | 11/2012 |

* cited by examiner

*Primary Examiner* — David V Bruce
(74) *Attorney, Agent, or Firm* — H.C. Park & Associates, PLC

(57) ABSTRACT

A moisture removing lamp for a vehicle that autonomously generates electricity and may be charged with electricity by using a solenoid generator that uses vibration of the vehicle, thereby removing moisture in the lamp for a vehicle in an environmentally-friendly manner.

14 Claims, 4 Drawing Sheets

1

MOISTURE REMOVING DEVICE OF LAMP FOR VEHICLE

CROSS-REFERENCE TO RELATED APPLICATION

This application claims priority from and the benefit of Korean Patent Application No. 10-2014-0058261, filed on May 15, 2014, which is hereby incorporated by reference for all purposes as if fully set forth herein.

BACKGROUND

1. Field

Exemplary embodiments of the present invention relate to a moisture removing device of a lamp for a vehicle, and more particularly, to a moisture removing device of a lamp for a vehicle that may autonomously generate electricity and be charged with electricity by using a solenoid generator that uses vibration of the vehicle, thereby removing moisture in the lamp for a vehicle in an environmentally-friendly manner.

2. Discussion of the Background

A vehicle includes front lamps and rear lamps. The front lamps include headlamps, fog lamps, and direction indicating lamps that are mounted at the front side of the vehicle, and that are mounted at the rear side of the vehicle. The front lamps and the rear lamps are used to emit light, which radiate from the respective lamps, to the front and rear sides of the vehicle, in order to ensure visibility for a driver in low visibility conditions, such as when the vehicle travels at night or on a rainy day, or to inform drivers in other vehicles of situations such as a change in the direction of the vehicle, a braking operation, and rearward movement of the vehicle.

External air, which may include varying amounts of moisture, flows into the lamp for a vehicle while the driver drives the vehicle, and a condition of air in the lamp becomes a low-temperature condition when the lamp is not used. As a result, there is a problem in that moisture is created in the lamp and dew condensation occurs as a result of a difference in temperature between the inside and the outside of the lamp. In a case in which a passage through which external air flows into the lamp is blocked, or the lamp is sealed in consideration of the aforementioned problem, there may be a problem in that a temperature in the lamp may rise high enough such that lamp components or the interior of a lamp housing may become overheated.

Moisture may also be created, and dew condensation may also occur, in the lamp as described above, in weather with high humidity and/or a daily temperature range is great. The moisture or the dew condensation in the lamp for a vehicle may create light blurring, which is a factor that hinders safe driving of the driver, and may shorten lifespans of the lamp components.

Accordingly, various types of related arts have been proposed in order to remove moisture generated in the lamp for a vehicle. For example, Korean Patent Application Laid-Open No. 10-2011-0037032 discloses a moisture removing device of a headlamp, which quickly removes moisture in the headlamp by forcedly recirculating air in the headlamp using external air that flows at the periphery of the headlamp when the vehicle travels.

Korean Patent Application Laid-Open No. 10-2012-0124873 discloses a structure for preventing moisture from being generated in a headlamp for a vehicle, which removes moisture generated on a lens of the headlamp by providing a heat source sheet, which may generate heat between a lower end of the lens and a bezel where moisture is generated when the headlamp is operated.

Korean Patent Application Laid-Open No. 10-2008-0003991 discloses a lamp device for a vehicle, which removes moisture using a venting hole formed at one side of a housing of a lamp for a vehicle, and a moisture absorbent that is disposed between a flow hole and the venting hole in the lamp housing.

Korean Patent Application Laid-Open No. 10-2009-0051616 discloses an anti-fog coating composition for a headlamp lens, which does not directly remove moisture but instead changes moisture to be formed as a water film instead of being formed in a droplet shape, by coating the headlamp with an anti-fog coating agent.

The aforementioned moisture removing devices and technologies in the related art may remove moisture in the lamp or may prevent dew condensation while the vehicle travels, but there is a need for technologies that may further enhance an effect of removing moisture in the lamp or preventing dew condensation, and may automatically remove moisture in the lamp during the night time or while the vehicle is parked for a long period of time.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments of the present invention provide a safe driving environment to a driver by effectively removing moisture in a lamp.

Exemplary embodiments of the present invention provide a moisture removing device of a lamp for a vehicle, which may improve the lifespans of various lamp components, while the vehicle travels or is parked for a long period of time, by automatically removing moisture in the lamp, and may remove moisture in the lamp in an environmentally-friendly manner without using an external electric power source or resources and without producing chemical by-products because a solenoid generator generates electricity using vibration of the vehicle.

Additional aspects will be set forth in the detailed description which follows, and, in part, will be apparent from the disclosure, or may be learned by practice of the inventive concept.

An exemplary embodiment of the present invention discloses a moisture removing lamp for a vehicle including: a lamp housing; an electricity generating unit including a solenoid generator installed at a predetermined position inside the lamp housing; an electricity storage unit connected with the solenoid generator and installed at a predetermined position inside the lamp housing; a moisture removing device connected with the electricity storage unit, which is supplied with electricity from the electricity storage unit and removes moisture; and a control unit connected with the electricity storage unit, which controls supply of electricity between the electricity storage unit and the moisture removing device.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
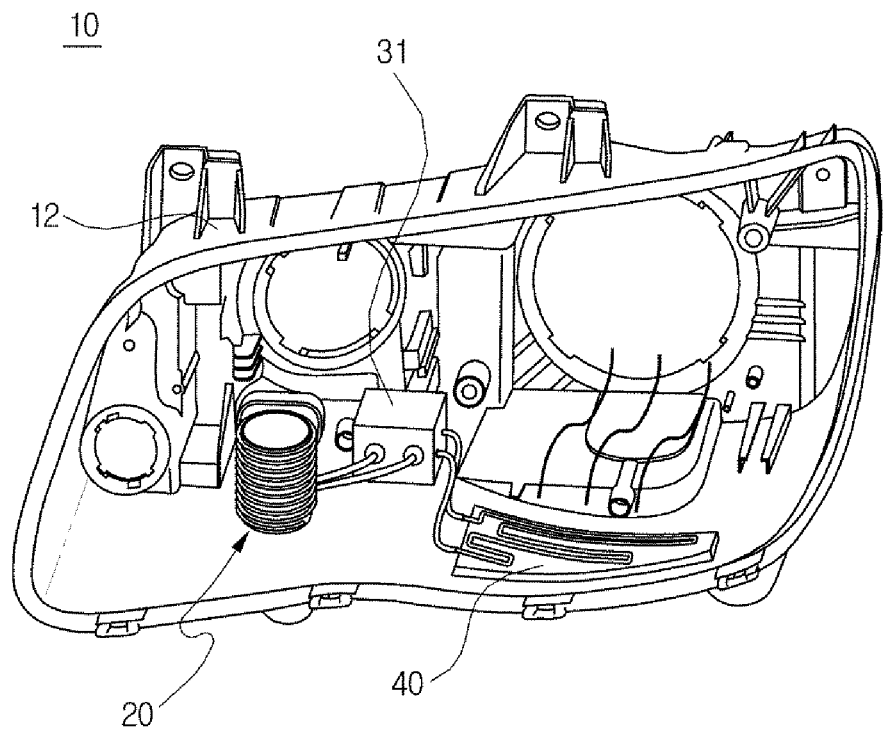
FIG. 1 is a perspective view of a moisture removing device of a lamp for a vehicle according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Figure 2:
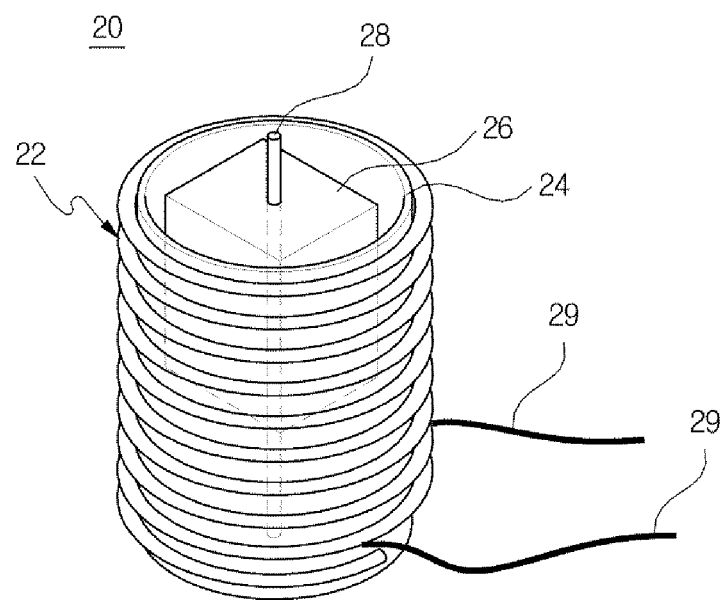
FIG. 2 is a detailed view illustrating a solenoid generator in FIG. 1.
Figure 5:
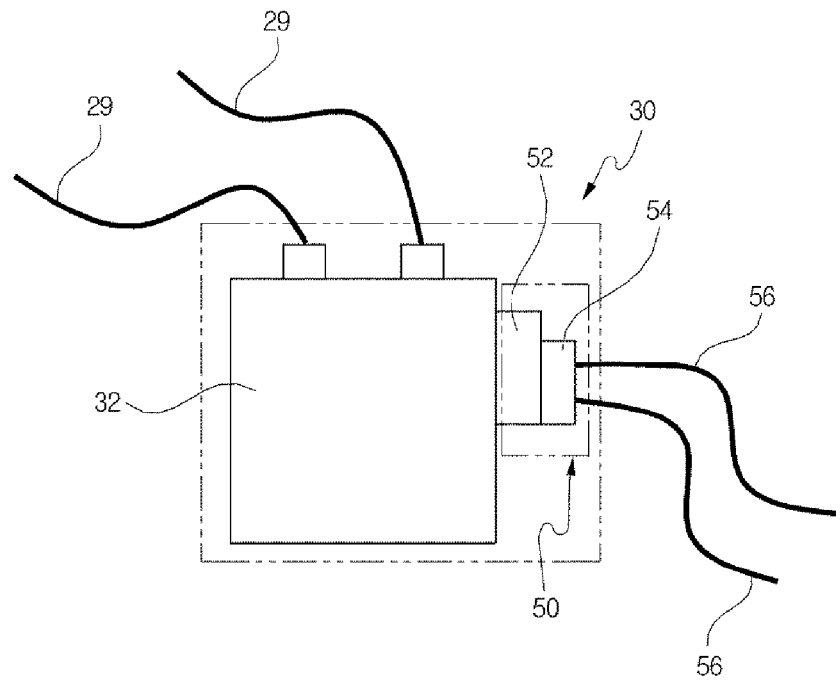
FIG. 5 and FIG. 6 are transparent views illustrating a plan view and an end view, respectively, of the interior of FIG. 4.
Figure 6:
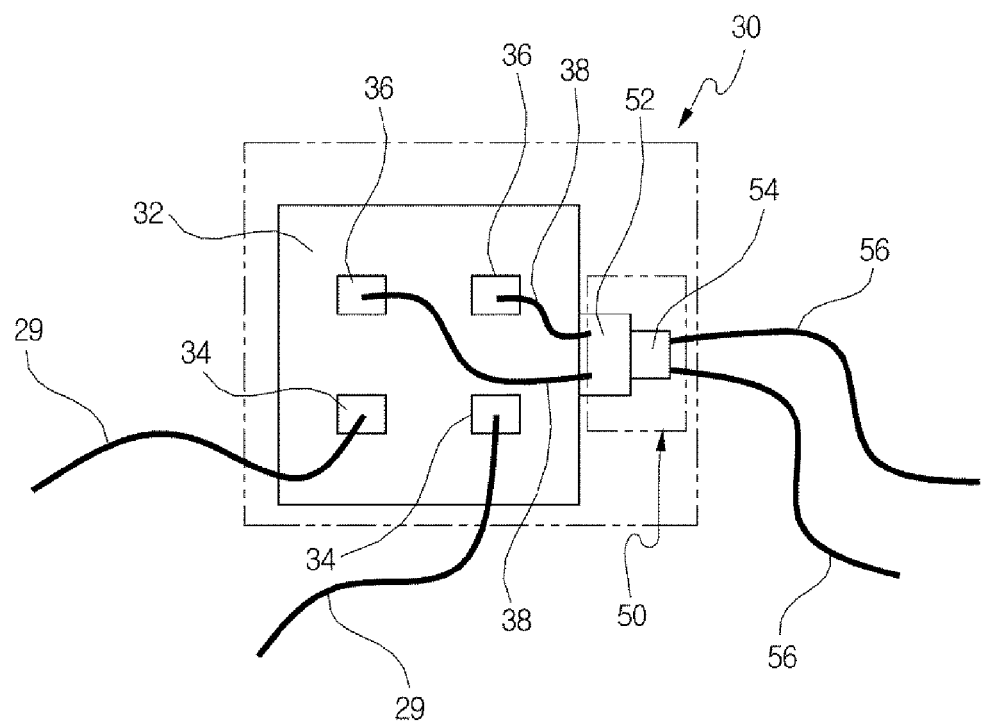

Referring to FIGS. 1 and 2, a moisture removing lamp for a vehicle according to an exemplary embodiment of the present invention includes a lamp housing 12, an electricity generating unit 20 that includes a solenoid generator 22 installed at a predetermined position inside the lamp housing 12, an electricity storage unit 30 connected with the solenoid generator 22, a moisture removing device 40 which is connected with the electricity storage unit 30 and removes moisture when supplied with electricity from the electricity storage unit 30, and a control unit 50 (shown in FIGS. 5 and 6). The control unit 50 and the electricity storage unit 30 may both be contained in an electricity storage unit housing 31, and the control unit 50 is connected with the electricity storage unit 30 to control the supply of electricity between the electricity storage unit 30 and the moisture removing device 40.

The lamp 10 for a vehicle includes the lamp housing 12, in which a light source, a lens, and various types of components are generally installed and mounted. A vacant space into which light is emitted is formed inside the lamp housing 12.

The solenoid generator 22, the electricity storage unit 30, and the moisture removing device 40 are positioned at predetermined positions inside the lamp housing 12. The solenoid generator 22 and the electricity storage unit 30 may be disposed in a predetermined space formed outside the lamp housing 12 instead of being disposed inside the lamp housing 12. The solenoid generator 22, the electricity storage unit 30, and the moisture removing device 40 may be detachably formed, and may be installed in the lamp housing 12 in a detachable manner. Such a configuration allows any one of the solenoid generator 22, the electricity storage unit 30, and the moisture removing device 40 to be easily replaced when the solenoid generator 22, the electricity storage unit 30, or the moisture removing device 40 has a problem.

Referring to FIG. 2, the solenoid generator 22 may include a solenoid 24 and a magnet 26 positioned inside the solenoid 24.

The solenoid 24 includes a coil that is wound in a cylindrical shape. The coil is configured to induce an electric current, and is formed by winding a conductive wire on a coil protection material. A copper wire, an aluminum wire, or the like may be used as the coil, and magnetic force is generated in the coil when an electric current flows through the coil.

The magnet 26 positioned in the solenoid 24 may be a permanent magnet. The permanent magnet preserves a strongly magnetized state for a long period of time, and may stably maintain magnetism even though electrical energy is not supplied from the outside. The magnet 26 may have a quadrangular shape or a circular shape.

The solenoid generator 22 is operated based on an operational principle in which electromotive force is produced at the solenoid 24 when the magnet 26 is inserted into the solenoid 24 and is caused to vibrate with a back-and-forth motion. In this case, when directions of the movement of the poles of the magnet 26 are changed, a direction of a flow of electromotive force may also be changed. In addition, as the speed at which the magnet 26 moves is further increased, electromotive force produced at the solenoid 24 becomes stronger. That is, Faraday's law is applied in consideration of electromagnetic induction in which, as the movement speed of the magnet 26 increases, the frequency of the generated electricity also becomes higher. Furthermore, as the number of winding turns on the cylinder is increased, the magnetic force of the solenoid 24 becomes stronger.

The electromotive force produced at the solenoid 24 is induced electromotive force, and an electric current in this case is called an "induced" current. The induced electromotive force is produced at the solenoid 24 when the magnet 26 positioned in the solenoid 24 moves. An amount of produced electricity varies depending on the number of winding turns of the coil of the solenoid 24 and momentum of the magnet 26.

Therefore, the solenoid generator 22 may produce electricity by maximizing the movement of the magnet 26, which is positioned in the solenoid 24, using vibration of the vehicle. That is, vertical movement of the magnet 26 is induced by using vibration of the vehicle for the magnet 26, and strong electricity may be generated by increasing speed of the vertical movement of the magnet 26, which is positioned in the solenoid 24, using vibration of the vehicle.

In an exemplary embodiment of the present invention, a vibration transmitting shaft 28, which transmits vibration, may be installed in a central portion of the magnet 26 in order to enhance the vertical movement of the magnet 26. The vibration transmitting shaft 28 is directly coupled to the central portion of the magnet 26. The magnet 26 receives vibration of the vehicle from the vibration transmitting shaft 28 such that the magnet 26 may move in reciprocating manner, thereby producing electricity. The vibration transmitting shaft 28 may be formed in a cylindrical stick shape, as illustrated in the exemplary embodiment of the present invention, but may be formed in other shapes. Alternatively, the vibration transmitting device, which transmits vibration of the vehicle, may be separately installed in the lamp housing 12. The vibration of the vehicle may include both inherent vibrations of the vehicle itself, which are generated when an engine of the vehicle is operated and when wheels and inner shafts of the vehicle are rotated, and external vibrations that are generated according to various conditions of a road on which the vehicle travels, as well as other external factors.

The solenoid generator 22 is configured according to the aforementioned principles, and generates electricity such that the moisture removing device may be considered to be: (1) economical, because electricity may be produced only through self-generation without using a separate external electric power source disposed outside the lamp; and (2) environmentally friendly, because no external resource is used and no chemical by-product is produced. The material of the coil of the solenoid 24 and the type of magnet are not limited to the aforementioned description, and may be substituted by other materials and other types.

Figure 3:
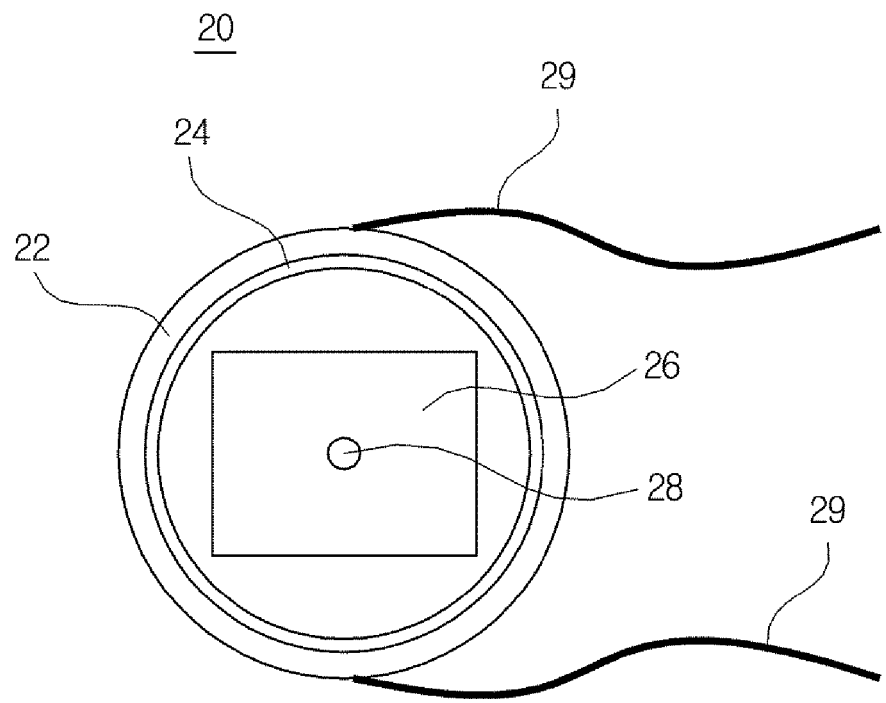
FIG. 3 is a top plan view of FIG. 2.
Figure 4:
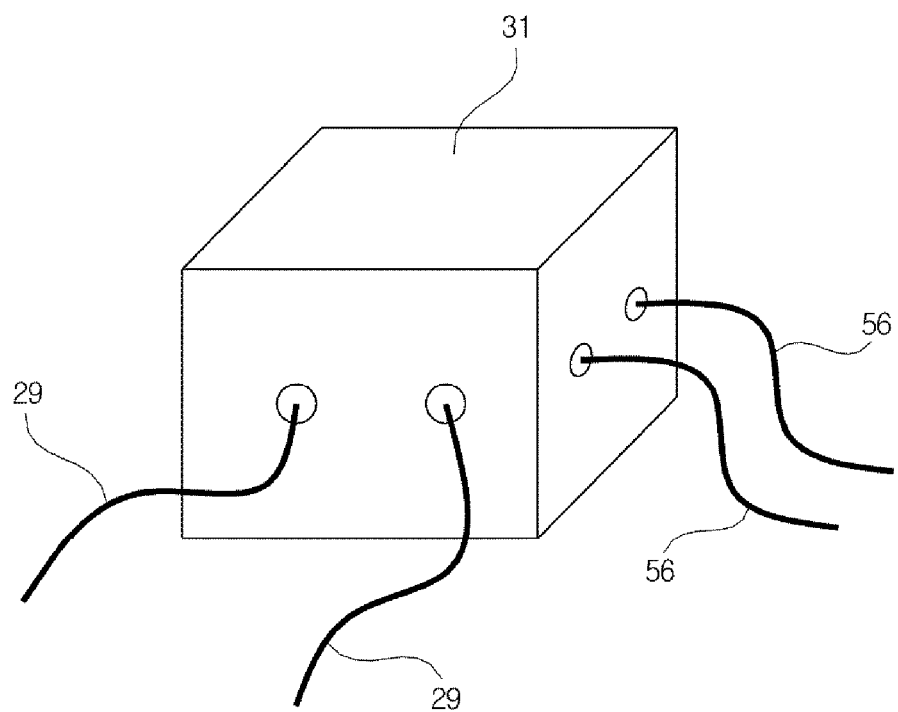
FIG. 4 is a detailed view illustrating an electricity storage unit of FIG. 1.

Referring to FIGS. 3 and 4, the electricity storage unit 30 may be supplied with electricity generated by the solenoid generator 22 through generator sending lines 29, store electricity, and supply the stored electricity to the moisture removing device 40 positioned in the lamp housing 12. In addition, even after the vehicle is shut down, the electricity storage unit 30 may supply electricity stored in the electricity storage unit 30 to the moisture removing device 40 such that the moisture removing device 40 may be operated.

Therefore, the electricity storage unit 30 may supply electricity stored in the electricity storage unit 30 to the moisture removing device 40, such that the moisture removing device 40 may remove moisture in the lamp 10 for a vehicle and prevent dew condensation while the vehicle is parked for a long period of time. As a result, the lamp 10 exhibits its own functionality when the vehicle restarts, thereby providing an environment in which a driver may safely drive the vehicle.

Referring to FIGS. 5 and 6, the electricity storage unit 30 may include a storage battery 32 in an exemplary embodiment. The storage battery 32 may include a storage battery receiving unit 34 which is supplied with electricity from the solenoid generator 22, and a storage battery sending unit 36 which supplies electricity to the moisture removing device 40. The storage battery receiving unit 34 and the storage battery sending unit 36 may be configured as terminals, and may be connected to the generator sending lines 29 and storage battery sending lines 38, respectively. The configuration in which electricity is transmitted through electric wires is one exemplary embodiment of the present invention, and may be substituted by other configurations.

The storage battery 32 may be a rechargeable battery in an exemplary embodiment. The rechargeable battery has a high capacity to store electricity, and may be charged with electricity. In addition, in another exemplary embodiment, the electricity storage unit 30 may be configured to use a capacitor in place of the storage battery 32. The capacitor may be configured as an electric double-layer capacitor. When configured with the electricity double-layer capacitor, deterioration is less even though charge and discharge are carried out several ten thousand times, and the electricity double-layer capacitor may accumulate a large amount of energy and be environmentally friendly. Therefore, the electricity storage unit 30 is not limited to any one of the rechargeable battery 32 and the capacitor, and as necessary, the electricity storage unit 30 may be substituted by other components having a function of being supplied with and storing electricity produced by the solenoid generator 22, and supplying the stored electricity to the moisture removing device 40.

The control unit 50 is positioned between the electricity storage unit 30 and the moisture removing device 40. As illustrated in FIGS. 5 and 6, the control unit 50 is positioned between the storage battery sending lines 38 of the electricity storage unit 30 and the moisture removing device 40, and may control supply of electricity supplied from the storage battery 32 to the moisture removing device 40 via moisture removing device control lines 56. The storage battery sending lines 38 are illustrated to explain one exemplary embodiment of the present invention, but the storage battery sending unit 36 and the control unit 50 may be directly coupled to each other without using a separate electric wire.

The control unit 50 includes a humidity detecting sensor 52, which detects humidity in the lamp 10 for a vehicle, and a controller 54 which is connected with the humidity detecting sensor 52, and controls supply of electricity supplied to the moisture removing device 40 in accordance with a change in humidity in the lamp 10 for a vehicle. The control unit 50 is configured such that when humidity in the lamp 10 for a vehicle exceeds a predetermined humidity value, the humidity detecting sensor 52 of the control unit 50 transmits a signal to the controller 54, and the controller 54 allows electricity stored in the electricity storage unit 30 to be supplied to the moisture removing device 40, such that the moisture removing device 40 may be operated. In addition, when humidity in the lamp 10 for a vehicle is equal to or less than the predetermined humidity value, the controller 54 may cut off electricity supplied from the electricity storage unit 30 to the moisture removing device 40.

Accordingly, the control unit 50 may automatically control supply of electricity supplied from the electricity storage unit 30 to the moisture removing device 40 without performing a separate manipulation, thereby automatically removing moisture, and preventing electricity from being wasted.

In addition to the aforementioned configuration, the control unit 50 may be configured so that the humidity detecting sensor 52 and the controller 54 are integrally coupled to each other. The humidity detecting sensor 52 may have a control function that may control supply of electricity. In addition, the humidity detecting sensor 52 of the control unit 50 may be connected with an instrument panel or a monitor disposed in front of a driver seat so that the driver seated on the driver seat may confirm and control humidity detected by the humidity detecting sensor 52 or conditions in the lamp 10 for a vehicle. The configuration of the control unit 50 is not limited to any one type, but may be substituted by other configurations as long as the control unit 50 has functions of detecting humidity and controlling supply of electricity.

Figure 7:
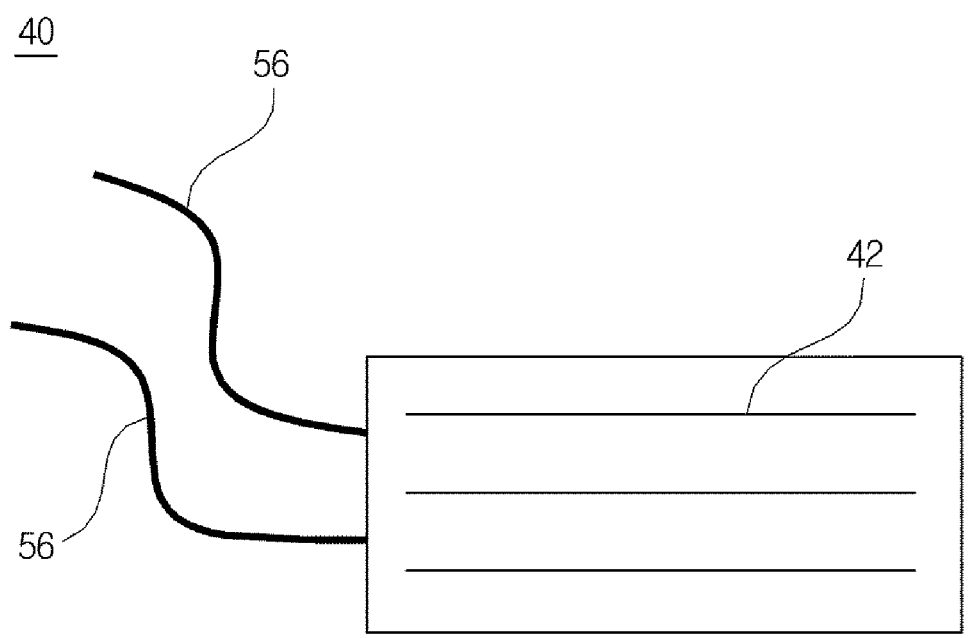
FIG. 7 is a detailed view illustrating the moisture removing device of FIG. 1 in detail.

Referring to FIG. 7, the moisture removing device 40 is operated using electricity of electricity storage unit 30, which is supplied by the control unit 50 via moisture removing device control lines 56. The moisture removing device 40 may be configured as a heat generating device that generates heat when supplied with electricity. The heat generating device may be configured as a heat generating plate 42 that is made by manufacturing a heat generating member, which generates heat using electricity, in a plate shape so as to uniformly emit the generated heat. The heat generating plate 42 has an effect of lowering humidity and removing moisture in the lamp 10 for a vehicle using heat generated by the heat generating plate 42. In addition, the heat generating device may be configured as a heating wire that emits heat using electricity like the heat generating plate 42.

The moisture removing device 40 may be configured as a fan that circulates air using electricity. The fan forcedly circulates air including moisture in the lamp 10 for a vehicle so as to discharge air including moisture to the outside of the lamp 10, thereby removing moisture. Further, the fan may reduce a difference in temperature between the inside and the outside of the lamp 10 for a vehicle, thereby preventing dew condensation.

In another example, the heat generating device and the fan may be coupled to each other and used. In a case in which a light emitting diode (LED) is used as a light source, since the LED is vulnerable to heat, the fan may be installed in the vicinity of the LED light source so as to discharge hot air around the LED light source, and moisture in the lamp housing 12 may be removed using the heat generating device.

The moisture removing device 40 is not limited to the fan, the heat generating plate 42, or the heating wire, but may be configured to have a function of removing moisture as necessary, and be operated by being controlled by the control unit 50. In addition, a plurality of fans or a plurality of heat generating plates 42 may be installed in the lamp 10 for a vehicle. As the moisture removing device 40, one heat generating plate 42 or one fan, which has a large size, may be installed as described in the exemplary embodiment of the present invention, but two or more heat generating plates or two or more fans, which are smaller than those in the exemplary embodiment of the present invention, may be installed in consideration of a size of the lamp housing 12, emission of light, and a flow of air.

According to the moisture removing device of a lamp for a vehicle according to an exemplary embodiment of the present invention, a solenoid generator is installed in the housing of the lamp for a vehicle, such that the solenoid generator generates electricity using vibration of the vehicle, and the generated electricity is stored in the electricity storage unit. The humidity detecting sensor of the control unit connected with the electricity storage unit detects humidity in the lamp, the control unit controls supply of electricity supplied from the electricity storage unit to the moisture removing device when humidity in the lamp exceeds a predetermined humidity value, and the moisture removing device is operated, thereby removing moisture in the lamp.

Even though a driver does not drive the vehicle, the control unit automatically allows electricity stored in the electricity storage unit to be supplied to the moisture removing device, and the moisture removing device to be operated, thereby always maintaining a predetermined humidity value, preventing the interior of the lamp from being humid, and preventing dew condensation. Therefore, the lifespans of the lamp components may be improved, and a state in which the lamp may exhibit its own functionality may be maintained even though the vehicle restarts after a long period of time has elapsed.

The present invention does not require a separate electric power source disposed outside the lamp in order to operate the moisture removing device in the lamp, thereby saving energy in the vehicle, and providing a structure that is not complicated. The moisture removing device autonomously generates electricity and is charged with electricity by using the solenoid generator that produces electricity using vibration of the vehicle. As a result, the moisture removing device is environmentally friendly and economical because no separate external electric power source or resource is used, and no chemical by-product is produced.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A moisture removing lamp for a vehicle, comprising:
   a lamp housing;
   an electricity generating unit comprising a solenoid generator installed at a predetermined position within the lamp housing;
   an electricity storage unit connected with the solenoid generator and installed at a predetermined position within the lamp housing;

a moisture removing device connected with the electricity storage unit, the moisture removing device configured to remove moisture from the lamp housing; and a control unit connected with the electricity storage unit, the control unit configured to control supply of electricity between the electricity storage unit and the moisture removing device.

2. The moisture removing lamp of claim 1, wherein the solenoid generator comprises:

a solenoid; and a magnet disposed within the solenoid.

3. The moisture removing lamp of claim 2, wherein the solenoid generator is configured to produce electricity by magnetic force that is formed by inducing movement of the magnet positioned in the solenoid using vibration generated in the vehicle.

4. The moisture removing lamp of claim 3, wherein the solenoid generator further comprises a vibration transmitting device configured to transmit vibration generated in the vehicle to the magnet.

5. The moisture removing lamp of claim 1, wherein:

the electricity storage unit is connected with the electricity generating unit;

the electricity storage unit is supplied with and stores electricity generated by the solenoid generator of the electricity generating unit; and the electricity storage unit is configured to supply the stored electricity to the moisture removing device.

6. The moisture removing lamp of claim 5, wherein:

the electricity storage unit comprises a storage battery; and the storage battery comprises:

an electricity receiving unit configured to be supplied with electricity from the solenoid generator; and an electricity sending unit configured to supply electricity to the moisture removing device.

7. The moisture removing lamp of claim 5, wherein:

the electricity storage unit comprises a capacitor; and the capacitor comprises:

an electricity receiving unit configured to be supplied with electricity from the solenoid generator; and an electricity sending unit configured to supply electricity to the moisture removing device.

8. The moisture removing lamp of claim 6, wherein the control unit is connected between the electricity sending unit of the electricity storage unit and the moisture removing device.

9. The moisture removing lamp of claim 1, wherein the control unit comprises:

a humidity detecting sensor configured to detect humidity in the lamp housing; and a controller connected with the humidity detecting sensor, and configured to operate the moisture removing device in the lamp when humidity in the lamp exceeds a predetermined humidity value.

10. The moisture removing lamp of claim 9, wherein the humidity detecting sensor and the controller are integrally coupled to each other.

11. The moisture removing lamp of claim 1, wherein the moisture removing device comprises:

a fan configured to circulate air when supplied with electricity from the electricity storage unit; and a heat generating device.

12. The moisture removing lamp of claim 1, wherein the moisture removing device comprises a fan configured to circulate air when supplied with electricity from the electricity storage unit.

13. The moisture removing lamp of claim 1, wherein the moisture removing device comprises a heat generating device configured to generate heat when supplied with electricity from the electricity storage unit.

14. The moisture removing lamp of claim 11, wherein the heat generating device comprises a heat generating plate configured to generate heat when supplied with electricity.

* * * * *